United States Patent
Shaw et al.

(10) Patent No.: US 8,715,491 B2
(45) Date of Patent: May 6, 2014

(54) STORM DRAIN CATCH BASIN FILTER WITH SAMPLING PORT

(76) Inventors: Mark D. Shaw, Ponte Vedra Beach, FL (US); J. Tad Heyman, Atlantic Beach, FL (US)

( * ) Notice: Subject to any disclaimer, the term of this patent is extended or adjusted under 35 U.S.C. 154(b) by 740 days.

(21) Appl. No.: 12/931,418

(22) Filed: Feb. 1, 2011

(65) Prior Publication Data
US 2011/0192775 A1      Aug. 11, 2011

Related U.S. Application Data

(60) Provisional application No. 61/337,199, filed on Feb. 1, 2010.

(51) Int. Cl.
*B01D 35/00* (2006.01)

(52) U.S. Cl.
USPC .............................................. 210/85; 210/163

(58) Field of Classification Search
CPC ...... B01D 17/00; B01D 23/28; B01D 29/085; B01D 29/11; B01D 2201/02; B01D 2201/04; B01D 2201/0407; B01D 2221/12; B02D 35/00; B02D 35/02; C02F 1/40; C02F 2103/001; E03F 1/00; E03F 1/001; E03F 1/002; E03F 1/005; E03F 5/02
USPC .................................... 210/84, 163, 164, 165
See application file for complete search history.

(56) References Cited

U.S. PATENT DOCUMENTS

| | | |
|---|---|---|
| 5,372,714 A | 12/1994 | Logue, Jr. |
| 5,575,925 A | 11/1996 | Logue, Jr. |
| 5,820,762 A | 10/1998 | Bamer et al. |
| 6,562,233 B1 | 5/2003 | Schilling et al. |
| 6,719,910 B1 | 4/2004 | Thiem et al. |
| 7,014,755 B2 | 3/2006 | Muir et al. |
| 2004/0016692 A1* | 1/2004 | Sasaki et al. .................. 210/473 |

* cited by examiner

*Primary Examiner* — Lucas Stelling
(74) *Attorney, Agent, or Firm* — Thomas C. Saitta

(57) ABSTRACT

A storm water catch basin filter having a sampling port such that a real-time sample can be taken of water flowing through the filter without the need to remove the filter, the sampling port being an opening preferably covered by a removable closure member or a self-sealing valve.

20 Claims, 4 Drawing Sheets

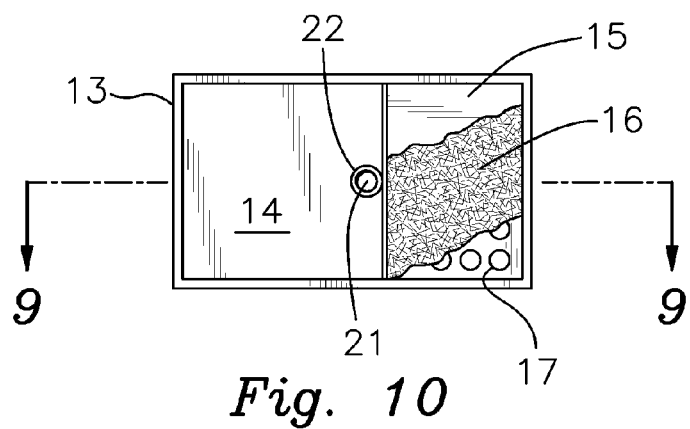
Fig. 10
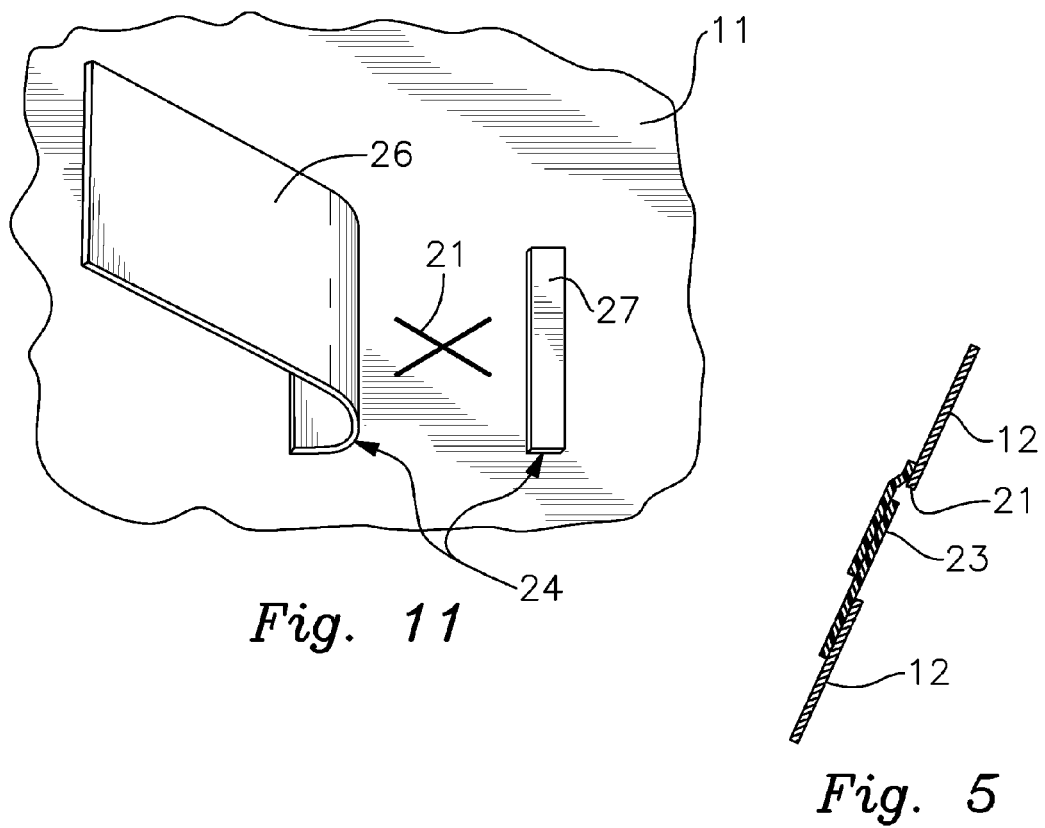
Fig. 11
Fig. 5

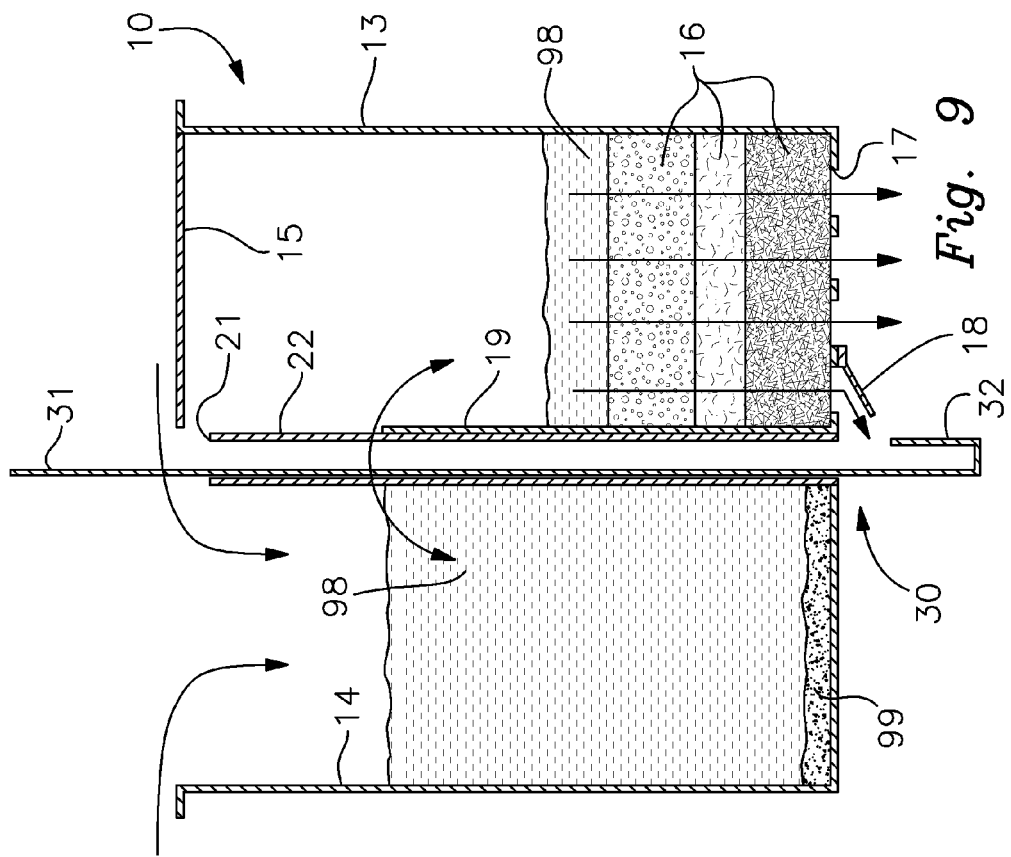
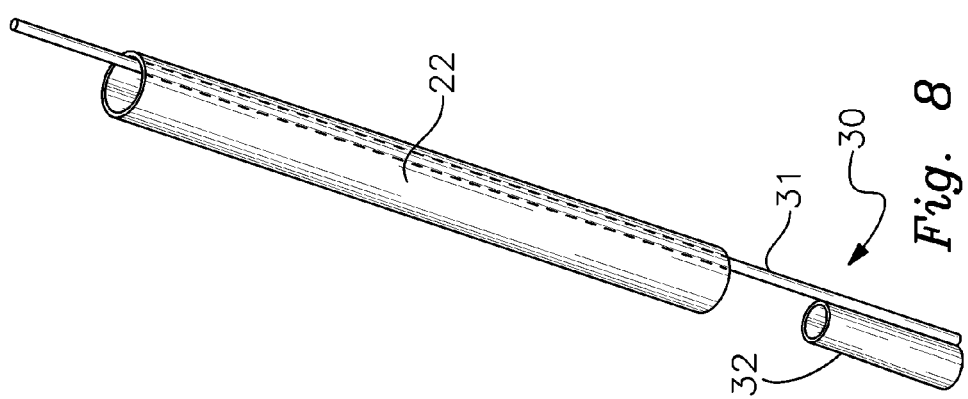

US 8,715,491 B2

STORM DRAIN CATCH BASIN FILTER WITH SAMPLING PORT

This application claims the benefit of U.S. Provisional Patent Application Ser. No. 61/337,199, filed Feb. 1, 2010.

BACKGROUND OF THE INVENTION

This invention relates generally to the field of catch basin filters used in conjunction with storm drains, such as are typically utilized with paved roads or parking lots to provide passage for rain water into a sewer or storm water underground conduit system, wherein the catch basin filters preclude debris, contaminants or hazardous waster from entering the underground conduit system.

Storm water systems usually comprise a plurality of grated storm drains set into a paved surface or along a curb, the drains allowing water from storm events to pass into an underground conduit system. The storm drains typically comprise catch basins—generally rectangular sumps having an outlet port opening into the removal conduits, the outlet port being raised a short distance above the sump bottom such that debris will be retained in the sump area. In many circumstances it is desirable or required that catch basin filters be utilized with the catch basins, the filters trapping debris, particulates, contaminants, hazardous waste, etc. before they enter the sump area. The filters are cleaned or replaced periodically or as needed.

One known type of catch basin filter comprises a horizontally disposed sheet-like filtering material, often formed with a depending sack-like member, which is placed on top of, envelopes, is attached to and/or is suspended from the apertured grate of the storm drain. Examples of this type of filter are shown in U.S. Pat. Nos. 5,372,714 and 5,575,925 to Logue, Jr. Another type of storm water filter uses a basket-like member that retains various filtering media, the basket-like member being suspended beneath the storm grate or mounted to the walls of the catch basin. An example of this type of filter is shown in U.S. Pat. No. 5,820,762 to Bamer et al. The disclosure of each of these patents is incorporated herein by reference.

In some instances it is desirable or required to take periodic or event-responsive samples of the storm water that has passed through the catch basin filter to insure that undesirable elements are not passing into the storm water conduit system. One way to accomplish this is to remove the storm grate and the catch basin filter to allow unencumbered access into the catch basin sump area for removal of a liquid sample. This technique is labor-intensive and time-consuming. Furthermore, sampling the water that is resident in the sump will not necessarily provide a true indication as to the continued effectiveness of the catch basin filter media or of the quality of the water passing through the filter, since the sump area can become contaminated and never purified, such that any sample taken will produce a negative result.

The '762 Bamer et al. patent shows a storm water catch basin filter that attempts to address this problem, but utilizes a relatively complex multi-valve and suction system to capture water flowing through the filter. Unfortunately however, this design suffers from the same drawback as the sump sampling method since a permanent cup is used to trap the sample, and this cup may become contaminated over time, thus giving false readings when samples are taken.

It is an object of this invention to provide a storm water catch basin filter that effectively addresses the problems outlined above by providing a sampling port for real-time sampling of storm water that has flowed through the filter, wherein the sampling port is easily accessible at any time.

SUMMARY OF THE INVENTION

The invention is a storm water catch basin filter apparatus or assembly having a sampling port whereby a sampling device can be inserted through the sampling port to capture and remove a sample of storm water that has flowed through the filter, without requiring removal of the storm grate and catch basin filter to provide access to the flow. Most preferably, the sampling port is self-sealing or sealable when not in use, as this will prevent unwanted passage of liquid through the sampling port. The sampling port may be present in various embodiments. In a simple form, the sampling port is a small opening through the filter material, the opening being of sufficient size to receive an elongated sampling device therethrough, with the port being sealed by a removable closure member or a self-sealing valve member. Alternatively, the sampling port may comprise a tube member or similar structural element passing through the catch basin filter, the tube member likewise being sealed with a removable closure or self-sealing valve member.

BRIEF DESCRIPTION OF THE DRAWINGS

FIG. 5 shows a double flap embodiment of a self-closing valve.

FIG. 8 illustrates a sampling device extending through a tubular member.

FIG. 9 is a cross-sectional view showing the catch basin filter of FIG. 10, taken along line IX-IX, showing a sampling port in an alternative catch basin filter structure that comprises a sediment chamber and multiple filter media.

FIG. 10 shows a sampling port in an alternative catch basin filter structure that comprises a sediment chamber and multiple filter media.

FIG. 11 an alternative embodiment of a closure member and sample port, the closure member being manually operated.

DETAILED DESCRIPTION OF THE INVENTION

With reference to the drawings, the invention will now be described in detail with regard for the best mode and preferred embodiments. In a general sense, the invention is a storm water catch basin filter apparatus or assembly having a sampling port whereby a sampling device can be inserted through the sampling port to capture and remove a sample of storm water that has flowed through the filter, without requiring removal of the storm grate and catch basin filter to provide access to the flow. The invention is applicable to or may comprise various embodiments of known catch basin filters, such as a catch basin filter comprising a horizontally disposed sheet-like filter member, or such a sheet-like filter member formed with a depending sack-like member, which is placed on top of, envelopes, is attached to and/or is suspended from the apertured grate of the storm drain. Another type of storm water filter uses a basket-like member that retains various filtering media, the basket-like member being suspended beneath the storm grate or mounted to the walls of the catch basin.

Figure 1:
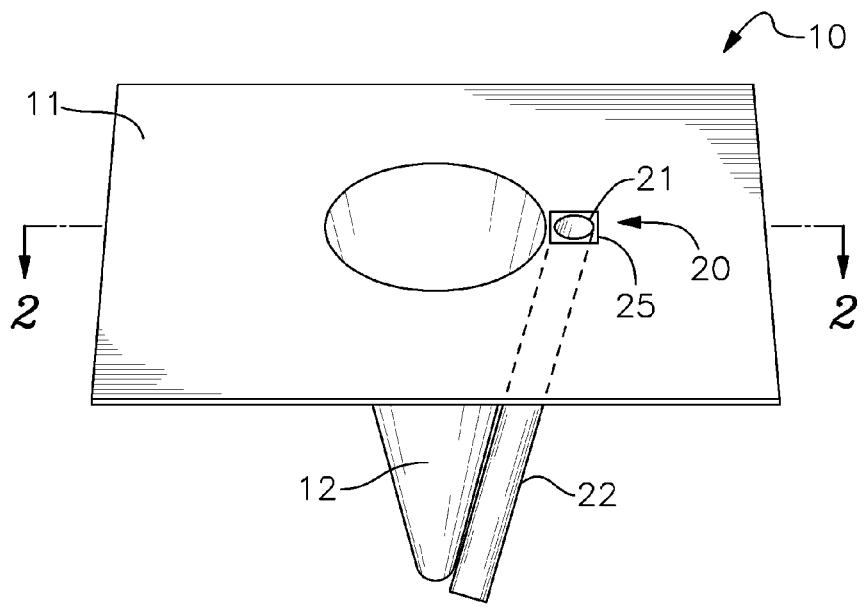
FIG. 1 is a perspective view of an embodiment of the invention showing the sampling port disposed in a horizontal portion of a catch basin filter.
Figure 2:
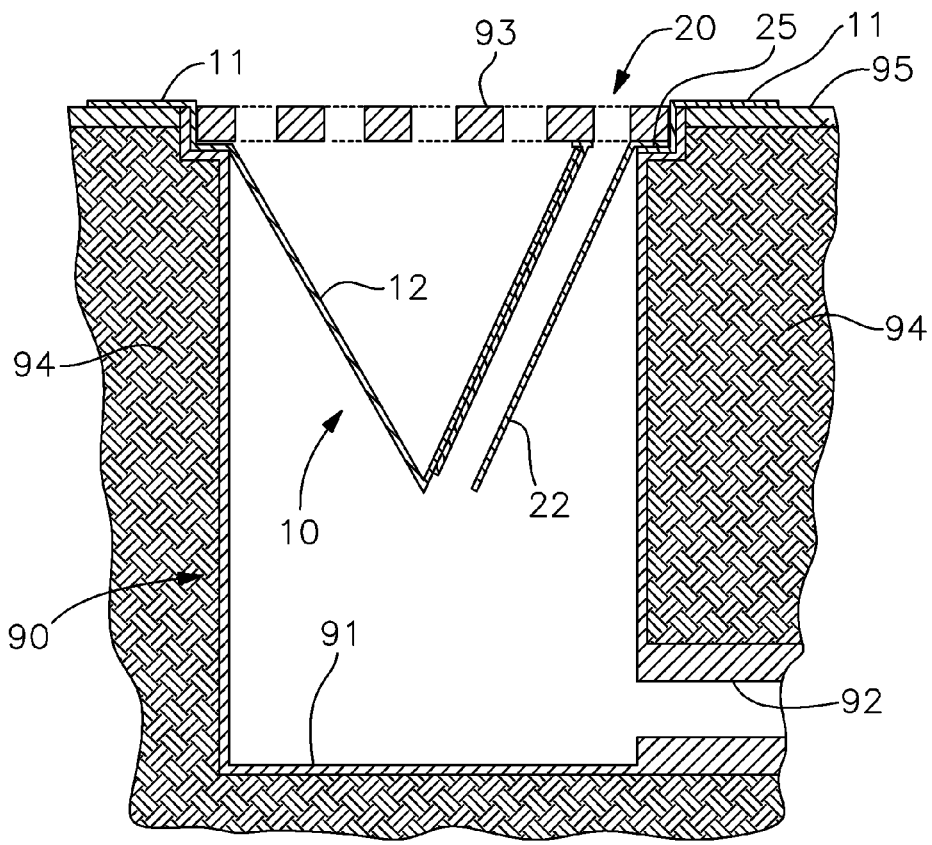
FIG. 2 is a cross-sectional view showing the catch basin filter of FIG. 1, taken along line II-II, disposed within a catch basin.

One embodiment of the invention is shown in FIGS. 1 and 2, wherein the catch basin filter 10 is shown to comprise a generally flat, horizontally disposed filter member 11 having a depending sack-like filter member 12, the catch basin filter 10 being positioned within a catch basin 90 by entrapping the horizontal filter member 11 between the grate 93 and upper portion of the catch basin at the paved surface 95. The filter members 11 and 12 are composed of liquid permeable, fabric material such that liquids may pass through the body of the filter members 11 and 12 but particulate material and larger debris will be precluded from passing through the material. The filter members 11 and 12 may also be composed of a specific material or treated in known manner to entrap certain hazardous liquid materials or chemicals, such as oil, gasoline and other hydrocarbons, for example. The catch basin 90 is disposed in the ground 94 and as shown typically comprises an outlet conduit 92 connected to a sump area 91, the catch basin 90 being formed of concrete. The sampling port 20 is disposed in such a manner as to allow for the introduction of a sampling device 30 for withdrawal of a sample of storm water 98 that has passed or is passing through the filter 10. The sampling device 30 may comprise for example an elongated rod 31 having a cup or other receptacle 32 attached to its end, as shown in the drawings, or it may comprise any suitable structure, such as one that incorporates a suction mechanism, flexible tubular members, etc., which is capable of withdrawing a liquid sample.

Figure 6:
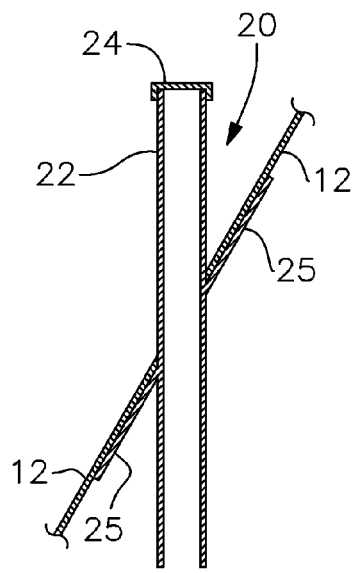
FIG. 6 shows an alternative embodiment for a sampling port comprising a tube member disposed in the side of the sack portion of the filter.
Figure 7:
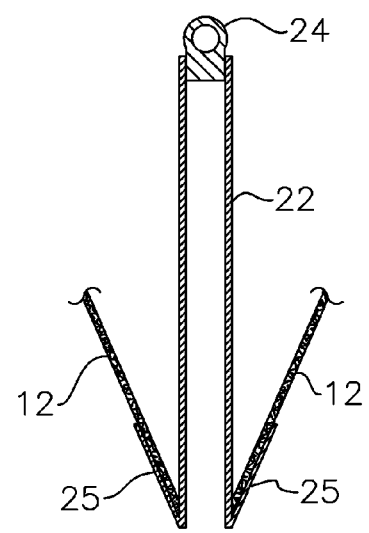
FIG. 7 shows an alternative embodiment for a sampling port comprising a tube member disposed in the bottom of the sack portion of the filter.

The sampling port 20 comprises an opening 21 that is sufficiently sized to allow for insertion and removal of the sampling device 30. The opening 21 may be disposed in the horizontal filter member 11, as shown in FIGS. 1-4, or in the sack-like filter member 12, as shown in FIGS. 5-7. A substantially rigid, tubular access conduit 22, formed for example of PVC or the like, is preferably provided and extends from the opening 21 to better guide the sampling device 30. Most preferably, in order to preclude any storm water 98 from bypassing the filtering means of the catch basin filter 10, the opening 21 or access member 22 is sealed to prevent liquid flow, such as by utilizing a removable closure member 24 in the form of a cap or plug for example, or by utilizing a self-sealing valve member 23.

The embodiment illustrated in FIGS. 1 and 2 shows a sampling port 20 comprising a rigid access conduit 22 mounted onto the horizontal filter member 11 using a mounting flange 25, which may be connected by bonding, stitching, mechanical fasteners, adhesive or other known means. The access conduit 22 angles downward and towards the center of the catch basin 90 so that its bottom opening is adjacent the bottom of the sack-like filter member 12. In this manner the sampling receptacle 32 of the sampling device 30 may be positioned directly beneath the lowermost portion of the sack-like filter member 12 to capture the liquid passing therethrough.

Figure 3:
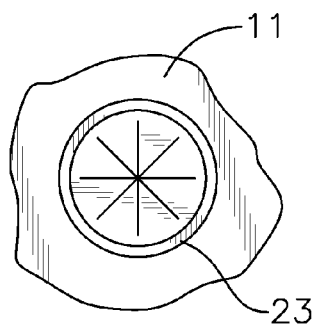
FIG. 3 shows a multi-slit embodiment of a self-closing valve.

FIG. 3 illustrates an embodiment for a self-sealing valve member 23, this embodiment comprising a multi-slit self-sealing valve formed preferably of a rubber or polymer material. While illustrated as being positioned on the horizontal filter member 11, this valve member 23 could also be positioned on the sack-like filter member 12. Access into the catch basin 90 is accomplished by pushing the sampling device 30 through the self-sealing valve member 23, the valve member 23 resealing upon withdrawal of the sampling device 30. This embodiment may be used in combination with a rigid access conduit 22 or without the access conduit 22 by positioning the valve directly on the filter members 11 or 12.

Figure 4:
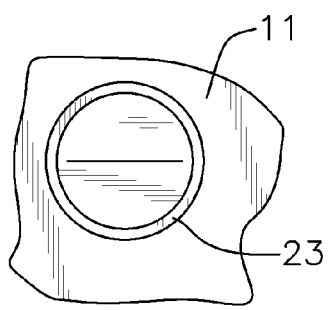
FIG. 4 shows a single slit embodiment of a self-closing valve.

FIG. 4 illustrates an alternate embodiment for a self-sealing valve member 23, this embodiment comprising a single slit self-sealing valve formed preferably of a rubber or polymer material. While illustrated as being positioned on the horizontal filter member 11, this valve member 23 could also be positioned on the sack like filter member 12. Access into the catch basin 90 is accomplished by pushing the sampling device 30 through the self-sealing valve member 23, the valve member 23 resealing upon withdrawal of the sampling device 30. This embodiment may be used in combination with a rigid access conduit 22 or without the access conduit 22 by positioning the valve directly on the filter members 11 or 12.

FIG. 5 illustrates an alternative embodiment for a self-sealing valve member 23, this embodiment comprising a pair of overlapping flaps, formed preferably of a rubber or polymer material. While illustrated as being positioned on the sack-like filter member 12, this valve member 23 could also be positioned on the horizontal filter member 11. Access into the catch basin 90 is accomplished by pushing the sampling device 30 through the self-sealing valve member 23, the valve member 23 resealing upon withdrawal of the sampling device 30. This embodiment may be used in combination with a rigid access conduit 22 or without the access conduit 22 by positioning the valve directly on the filter members 11 or 12.

FIGS. 6 and 7 illustrate alternative embodiments wherein the sampling port 20 comprises a rigid access conduit 22 that is mounted to the sack-like filter member 12 using a mounting flange 25. The access conduit 22 may pass through a wall of the sack-like filter member 12, as shown in FIG. 6, or through the lowermost portion of the sack-like filter member 12, as shown in FIG. 7. In these embodiments, the access conduit 22 should be long enough so that the upper end of access conduit 22 is positioned near, at or above the grate 93. This enables easy removal of the removable closure members 24 that are used to seal off the opening 21 of the sampling port 20, shown for example as a cap in FIG. 6 and a plug in FIG. 7.

FIG. 11 illustrates another alternative embodiment of a removable closure member 24, which in this example comprises a releasable flap member 26 in combination with a securing member 27, such as a hook-and-loop-type fastening combination. The flap member 26 is disposed over the sampling opening 21, such that the flap member 26 may be pulled out of the way for sampling, then returned to a closed position to cover the opening 21.

FIGS. 9 and 10 show a basket-type embodiment of a catch basin filter 10, wherein the catch basin filter 10 comprises a housing insert 13 adapted to be positioned within a catch basin 90 beneath a grate 93. Storm water 98 from the environment is first directed by a top plate 15 into a sediment chamber 14 for retaining sediment 99. Storm water 98 flows out of the sediment chamber 14 over a retention dam 19, through various filter media 16 and then out into the catch basin 10 through outlets 17. In the embodiment as shown, linear access conduit 22 is disposed through the bottom of the sediment chamber 14, the opening 21 of the access conduit 22 being positioned at or near the top of the catch basin filter 10. The access conduit 22 may be angled if desired. A diverter plate 18 may be provided to channel outflow water to a position directly beneath the access conduit 22 of the sampling port 20 such that it is readily sampled by inserting the sampling device 30 into the sampling port 20, as shown in FIG. 9.

It is contemplated that equivalents and substitutions for certain elements described and illustrated above may be obvious to those of ordinary skill in the art, and therefore the true scope and definition of the invention is to be as set forth in the following claims.

We claim:

1. A storm water catch basin filter comprising a horizontal filter member composed of a liquid permeable, fabric material, and a sealed sampling port disposed in said horizontal filter member, said sampling port adapted to receive a removable sampling device, whereby a sample of liquid that has passed through said storm water catch basin filter may be collected within said sampling device.

2. The filter of claim 1, wherein said sampling port comprises an opening disposed in said filter member and a rigid access conduit in communication with said opening.

3. The filter of claim 1, wherein said sampling port comprises a removable closure member.

4. The filter of claim 1, wherein said sampling port comprises a self-sealing valve member.

5. The filter of claim 2, wherein said sampling port comprises a removable closure member sealing said opening.

6. The filter of claim 2, wherein said sampling port comprises a self-sealing valve member sealing said opening.

7. A storm water catch basin filter comprising a horizontal filter member in combination with a sack-like filter member, both said filter members composed of a liquid permeable, fabric material, and a sealed sampling port disposed in either of said filter members, whereby a sample of liquid that has passed through said storm water catch basin filter may be collected, said sampling port adapted to receive a sampling device.

8. The filter of claim 7, wherein said sampling port comprises an opening disposed in said filter member and a rigid access conduit in communication with said opening.

9. The filter of claim 7, wherein said sampling port comprises a removable closure member.

10. The filter of claim 7, wherein said sampling port comprises a self-sealing valve member.

11. The filter of claim 8, wherein said sampling port comprises a removable closure member sealing said opening.

12. The filter of claim 8, wherein said sampling port comprises a self-sealing valve member sealing said opening.

13. The filter of claim 8, wherein said rigid access conduit passes through the side of said sack-like filter member.

14. The filter of claim 8, wherein said access conduit passes through the lowermost portion of said sack-like filter member.

15. The filter of claim 8, said sampling port further comprising a mounting flange connecting said access conduit to either said horizontal filter member or said sack-like filter member.

16. The filter of claim 8, wherein the bottom of said access conduit is disposed adjacent the lowermost portion of said sack-like filter member.

17. A storm water catch basin filter combination comprising a horizontal filter member in combination with a sack-like filter member, both said filter members composed of a liquid permeable, fabric material, a sealed sampling port disposed in either of said filter members, and a removable sampling device insertable through said sampling port, whereby a sample of liquid that has passed through said storm water catch basin filter may be collected, said sampling port adapted to receive said removable sampling device.

18. The filter of claim 17, wherein said sampling port comprises an opening disposed in said filter member and a rigid access conduit in communication with said opening.

19. The filter of claim 17, wherein said sampling port comprises a removable closure member.

20. The filter of claim 17, wherein said sampling port comprises a self-sealing valve member.

\* \* \* \* \*